Dec. 9, 1930.   W. N. BOOTH   1,784,218
METHOD OF FORMING VEHICLE WHEEL DISKS
Filed May 18, 1925   3 Sheets-Sheet 1
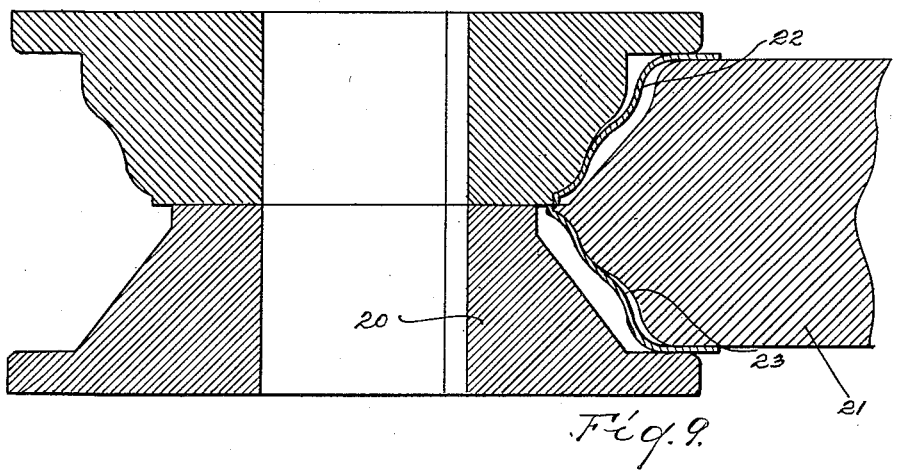
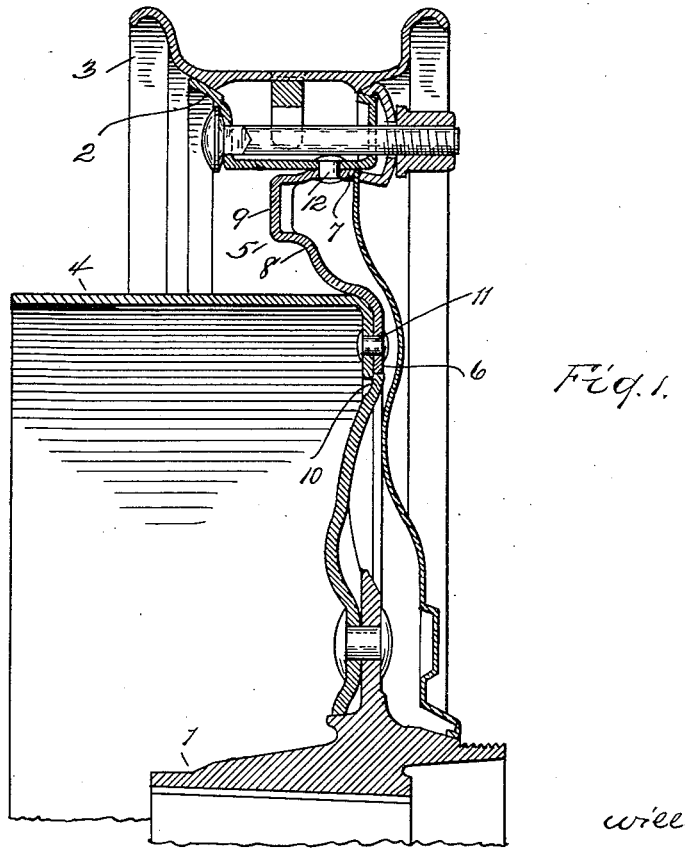
Inventor
William N. Booth Dec. 9, 1930.  W. N. BOOTH  1,784,218
METHOD OF FORMING VEHICLE WHEEL DISKS
Filed May 18, 1925  3 Sheets-Sheet 2
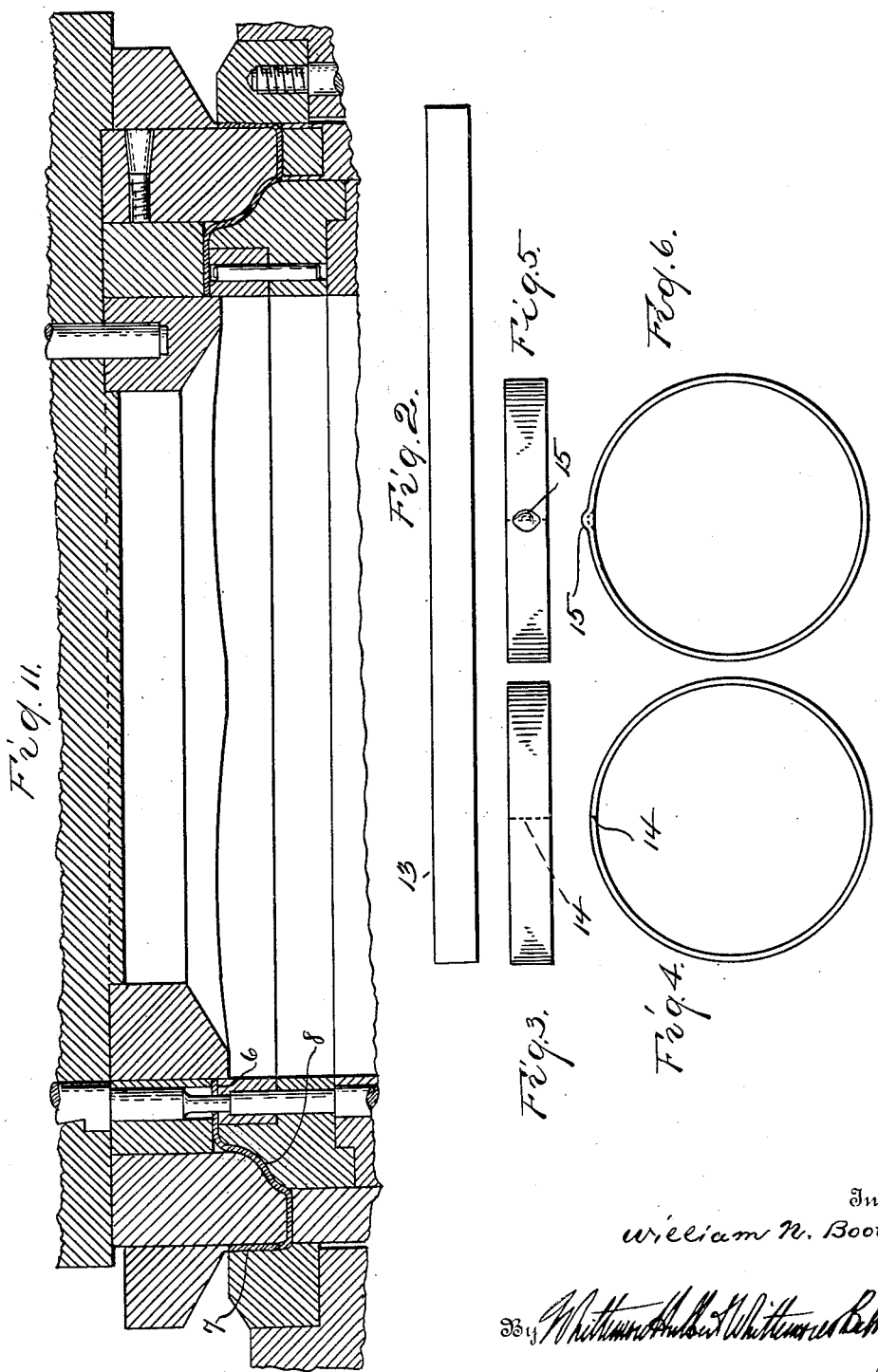
Inventor
William N. Booth
Attorneys Dec. 9, 1930.  W. N. BOOTH  1,784,218
METHOD OF FORMING VEHICLE WHEEL DISKS
Filed May 18, 1925   3 Sheets-Sheet 3

Inventor
William N. Booth
By Whittemore Hulbert Whittemore Belknap
Attorneys

Patented Dec. 9, 1930

1,784,218

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

METHOD OF FORMING VEHICLE WHEEL DISKS

Application filed May 18, 1925. Serial No. 31,147.

The invention relates to the manufacture of vehicle wheel disks and is especially applicable to the manufacture of annular spacers designed to connect the fellies to the brake drums or the like. One of the objects of the invention is to eliminate the waste of material that would ordinarily result in making an annular vehicle wheel disk from a flat sheet. Another object is to simplify the method of forming the annular disk to reduce its cost of manufacture. With these as well as other objects in view the invention resides in the novel features as more fully hereinafter set forth.

In the drawings:—

Figure 1 is a transverse section through a vehicle wheel having an annular disk formed with my method;

Figure 2 is a plan view of a blank from which the disk is formed;

Figures 3 and 4 are respectively a plan view and a side elevation of the blank after the first forming operation;

Figures 5 and 6 are respectively a plan view and a side elevation of the blank after the next forming operation;

Figures 7, 8, 9 and 10 are transverse sections through the blank after successive forming operations and showing the forming rolls;

Figure 11 is a transverse section through the completed blank and showing the forming side.

Figure 10:
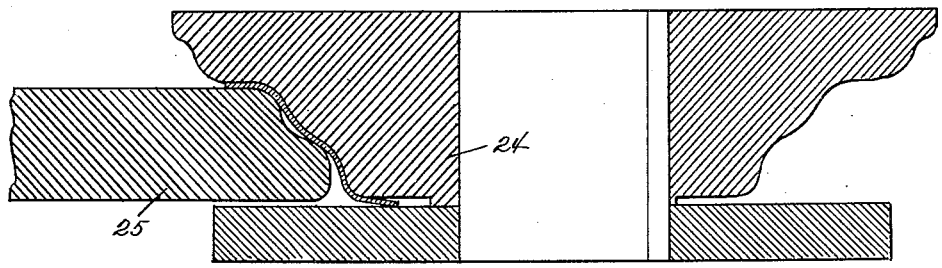

As shown in Figure 1, 1 is the hub of a vehicle wheel designed particularly for use upon motor vehicles and 2 is the felly upon which is mounted the demountable rim 3. 4 is the brake drum mounted upon the hub 1 and 5 is the annular wheel disk located between the felly and the brake drum and carrying the former upon the latter. This annular disk, which in the present instance is known as a spacer, has the radial flange 6 and the cylindrical flange 7 and the intermediate curved portion 8, the latter being provided with angularly spaced oppositely facing louvres 9 struck out therefrom. The radial flange 6 is located upon the brake drum by means of the struck out shoulders 10 upon the latter and abutting the inner edge of the former, and this radial flange is connected to the brake drum at its front side by means of the rivets 11. The cylindrical flange 7 is secured to the inner side of the felly 2 by means of the rivets 12.

For the purpose of manufacturing the annular disk or spacer 5 with the minimum waste of material I begin with the sheet steel blank 13 which preferably has a sufficient width to form two annular disks or spacers. This blank is hooped and its ends welded together at 14 to form an annulus as shown in Figures 3 and 4. This annulus is operated upon in a suitable die to form the outwardly extending depression 15 at the welded joint, the greatest depth of the depression being preferably on the median line of the annulus. Figures 5 and 6 show the blank with the depressed welded joint. This depression facilitates the subsequent rolling of the annulus and furthermore assists in preventing the welded joint from splitting.

Figure 8:
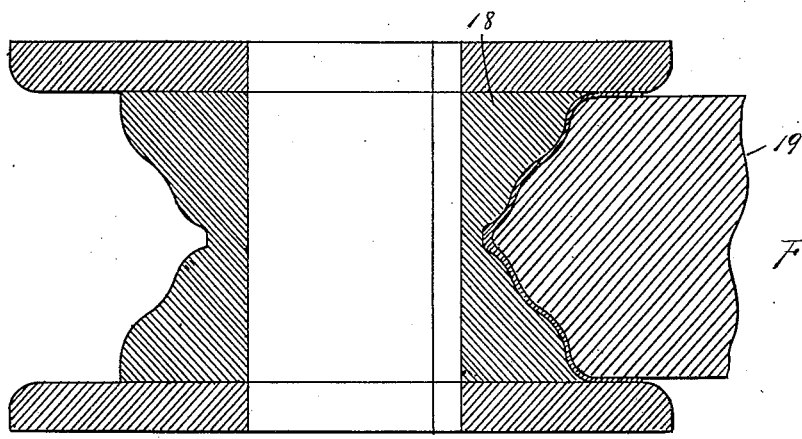
Figure 7:
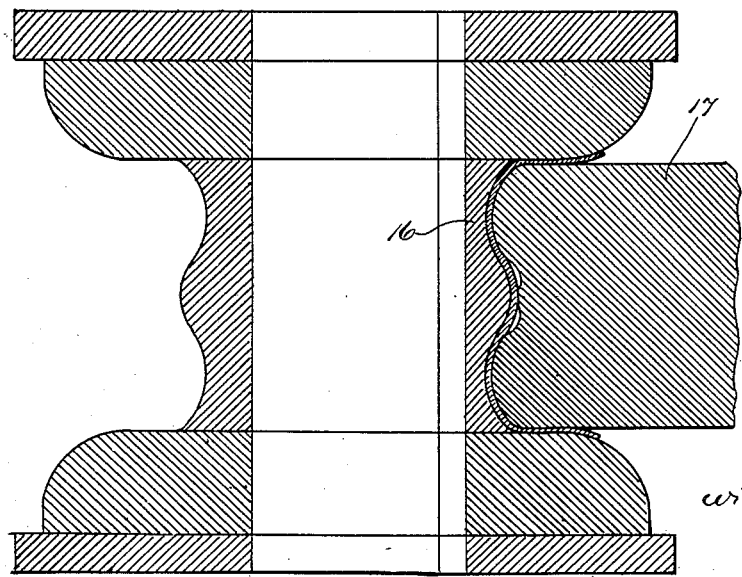

The next operation consists in fashioning the annulus between the rolls 16 and 17, shown in Figure 7, which expand the ends of the annulus and make the same substantially U-shaped with a convex base. The next set of rolls 18 and 19, as shown in Figure 8, then fashion the annulus after it has been removed from the rolls 16 and 17 to change the cross sectional contour of the annulus principally by making the base thereof concave. Both sets of rolls are preferably arranged to roll the annulus with a gradually decreasing thickness from its median line to its edges. After the annulus has been removed from between these rolls it is then passed between the shearing rolls 20 and 21 of Figure 9 which shear the annulus on its median line into complementary sections 22 and 23.

Each blank section is then passed between the fashioning rolls 24 and 25, shown in Figure 10, which change the cross sectional contour of the section principally by bending its sheared edge portion to extend substantially parallel to its opposite edge portion.

Each blank section is then finally fashioned in a suitable die such as that shown in Figure 11 by means of which the final cross sectional contour is secured with the sheared edge portion of the preceding blank innermost and extending radially and forming the radial flange 6 and the opposite edge portion extending cylindrically and forming the cylindrical flange 7. During this final forming operation the inner edge of the radial flange is sheared and the oppositely facing louvres 9 as well as the necessary holes for receiving the securing rivets are also preferably formed.

From the above description it will be seen that I form a blank into an annulus, fashion the annulus into a plurality of corresponding forms, sever the annulus intermediate the forms to produce a plurality of sections, and finally fashion the sections to produce the annular disks or spacers. Also that with this method the minimum material is wasted and the annular disks or spacers may be economically manufactured.

What I claim as my invention is:

1. The method of forming a vehicle wheel disk, which includes hooping a metal blank, welding its ends to form an annulus, forming an outwardly extending depression at the welded joint, rolling the annulus to fashion the same into a plurality of corresponding forms, severing the annulus intermediate the forms into a plurality of corresponding sections, and fashioning the sections into disks.

2. The method of forming a vehicle wheel body, which includes forming an annulus from a metal blank, rolling the annulus to fashion the same into a plurality of forms and with a gradually decreasing thickness from the median line thereof to its edges, severing the annulus intermediate the forms into a plurality of like sections, and pressing the sections to finished shape to form annular wheel disks.

3. In the method of forming a vehicle wheel disk those steps which include hooping a metal blank, welding its ends to form an annulus, fashioning the annulus into a plurality of forms and with a gradually decreasing thickness from the median line thereof to its edges, severing the annulus intermediate the forms into a plurality of sections, and finally fashioning the sections into disks.

4. Those steps in the method of forming a vehicle wheel disk which include hooping a metal blank, welding its ends to form an annulus, forming an outwardly extending depression at the welded joint, and rolling the annulus to fashion the same to a predetermined contour.

In testimony whereof I affix my signature.

WILLIAM N. BOOTH.